United States Patent [19]

Wagensonner et al.

[11] 3,813,680

[45] May 28, 1974

[54] CAMERA HAVING INCREMENTALLY CONTROLLABLE APERTURE

[75] Inventors: Eduard Wagensonner, Aschheim; Alfred Winkler, Muenchen, both of Germany

[73] Assignee: AGFA-Gevaert Aktiengesellschaft, Leverkusen, Germany

[22] Filed: Mar. 23, 1973

[21] Appl. No.: 344,369

[30] Foreign Application Priority Data

Mar. 25, 1972 Germany .............................. 2214725

[52] U.S. Cl. .............. 95/10 CD, 95/64 R, 260/205, 318/696, 352/141

[51] Int. Cl. ........ G03b 7/08, G03b 9/02, G01j 1/44

[58] Field of Search ........... 95/10 CD, 10 CE, 64 R, 95/64 P; 318/696; 250/206, 215; 352/141

[56] References Cited

UNITED STATES PATENTS

| | | | |
|---|---|---|---|
| 3,143,054 | 8/1964 | Ploke et al. | 95/10 CD X |
| 3,209,667 | 10/1965 | Coutont | 95/10 CD X |
| 3,426,662 | 2/1969 | Levin | 96/64 D X |
| 3,628,110 | 12/1971 | Casaday | 318/696 X |
| 3,709,137 | 11/1973 | Starp | 95/10 CD |

*Primary Examiner*—Joseph F. Peters, Jr.

*Attorney, Agent, or Firm*—Michael S. Striker

[57] ABSTRACT

A camera has light sensitive means which furnish a signal corresponding to the light available for an exposure. The camera has a diaphragm having an adjustable aperture. Electromagnetic step switch means are coupled to the diaphragm for changing the size of the aperture a predetermined increment in response to a predetermined number of control pulses. An astable multivibrator furnishes a sequence of control pulses. A differential amplifier furnishes an output signal when the size of the aperture differs from the desired size corresponding to the exposure signal. A first gate transmits the control pulses from the astable multivibrator to the input of the electronic step switch means when the output signal of the differential amplifier is positive, while a second gate transmits control pulses from the astable multivibrator to the electromagnetic step switch means when the differential amplifier output is negative. The two gates have outputs so-connected to the step switch means that an armature which is part of the step switch means rotates in a first direction in response to pulses applied from the first gate and in the opposite direction in response to pulses applied through the second gate. The aperture is opened further for one direction of rotation of the armature and closes when the armature rotates in the opposite direction.

12 Claims, 4 Drawing Figures

CAMERA HAVING INCREMENTALLY CONTROLLABLE APERTURE

BACKGROUND OF THE INVENTION

The present invention relates to cameras, including both still and motion picture cameras, which have light meter arrangements wherein a light sensitive element furnishes a signal corresponding to the light available for an exposure. It relates to arrangements wherein the signal furnished by such a light sensitive element is utilized to control the size of the aperture in a diaphragm which controls the light falling on the film.

It conventional cameras of the above-described type, the size of the aperture is controlled by means of a moving coil instrument, the current through which is varied as a function of the light falling on the photosensitive element. It has been found that these conventional arrangements may oscillate before attaining the desired aperture size. Further, they are not sufficiently accurate for all purposes and are subject to error from external shock and vibration. Further, the speed with which a desired aperture size can be achieved is not sufficient for all purposes and there is no possibility for remote control.

SUMMARY OF THE INVENTION

It is an object of the present invention to furnish an arrangement which obviates the above-described difficulties with the conventional equipment.

The present invention resides in a camera having light sensitive means for furnishing an exposure signal corresponding to the light available for an exposure and having diaphragm means having an adjustable aperture. It comprises an arrangement for adjusting the size of said aperture to a desired size corresponding to said exposure signal. The arrangement comprises electromagnetic step switch means coupled to said diaphragm means for changing the size of said aperture a predetermined increment in response to a predetermined number of control pulses applied to the electromagnetic step switch means. It further comprises control circuit means connected to said electromagnetic step switch means for furnishing a number of control pulses corresponding to the difference between the actual size of said aperture and said desired size to said electromagnetic switch means when said actual size differs from said desired size. When the steps in which the aperture size is changed are suficiently small in relation to the total possible variation of the aperture size, then an oscillation of the diaphragm elements is no longer possible. The possible error between the desired aperture size and the actual aperture size can be at the most the error corresponding to one step of the step switch means.

In a preferred embodiment of the present invention the light sensitive means furnish the signal at one input of a differential amplifier, the other input to which receives a signal corresponding to the actual aperture size. The control circuit means comprise a pulse generator which furnishes a sequence of pulses and it further comprises gating means which transmit the pulses from the pulse generator means to the electromagnetic switch means only when the differential amplifier furnishes an output signal indicative of the fact that the actual aperture size is not the desired aperture size.

In a further preferred embodiment of the present invention, the gating means comprise a first and second gating means each having a transistor, one of these transistors being an npn transistor, while the other is a pnp transistor. Further, the output signal of the differential amplifier has a positive or negative polarity depending upon whether the actual aperture size is less than or greater than the desired aperture size. Either the first or the second gating means are conductive, depending upon the polarity of the differential amplifier output voltage. Each of the gating means has a different gating output, the first gating output being connected to the electromagnetic switch means in such a manner that the aperture is opened, while the second gating output is connected to the electromagnetic switch means in such a manner that the aperture tends to close.

Also in a preferred embodiment of the present invention the electromagnetic step switch means comprise an armature and a plurality of electromagnetic coils arranged radially with respect to said armature. Coil energizing means are provided which energize the coils in a first predetermined sequence in response to pulses applied at said first gating output and in a second predetermined sequence in response to pulses applied at said second gating output. The armature rotates in a first or a second direction, depending upon whether said coils are being energized in said first or said second predetermined sequence.

In a further preferrred embodiment of the present invention, energization of one coil causes a substantially simultaneous deenergization of the previous coil in the particular sequence.

A preferred form of the pulse generator is an astable multivibrator.

In a further preferred embodiment of the present invention, a first and second source of electrical energy are connected in series at a common point. Energization for the differential amplifier and the pulse generator means is derived from the complete series-connected first and second source of electrical energy, while the gating means have a common terminal connected to the common point and a gating input connected to the output of said differential amplifier means.

In a further preferred embodiment of the present invention, each pulse applied to said electromagnetic step switch means causes a closing of the diaphragm for a predetermined fraction of said predetermined increment. The predetermined increment, in a preferred embodiment, is one *f* stop.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
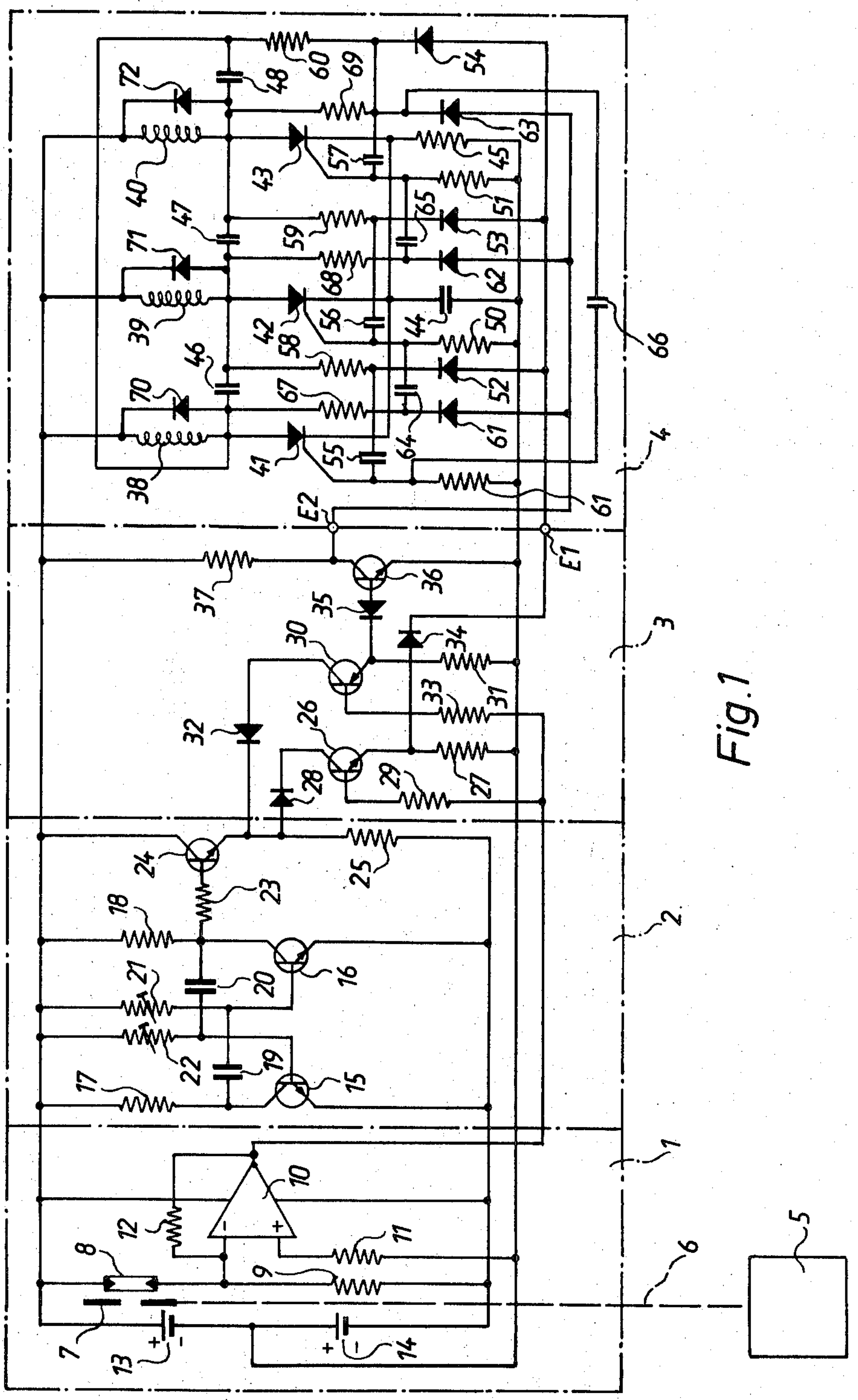
FIG. 1 is a circuit diagram of a first embodiment of the present invention.

A preferred embodiment of the present invention will now be described with reference to the drawing.

In FIG. 1, boxes 1, 2 and 3 comprise the control circuit means, while box 4 comprises the electromagnetic step motor means, that is, more specifically, the control circuit for the step motor means. Specifically, block 1 includes the means which furnish an output signal corresponding to the difference between the actual and the desired aperture size, block 2 comprises the pulse generator means, and block 3 comprises the gating means. Block 5 shows the mechanical parts of the step motor means in block form. A mechanical coupling between block 5 and the diaphragm 7 indicates that the size of the aperture of diaphragm 7 is under the mechanical control of the electromagnetic step motor 5. The diaphragm may be the main aperture diaphragm itself or an auxiliary diaphragm. If the latter is the case, a further connection from the electromagnetic step motor 5 to the main diaphragm is of course also required.

Block 1 contains a photoresistor 8 which is connected in series with a resistor 9. An operational amplifier 10 is shown which is connected as a differential amplifier and has a first, inverting, input connected to the common terminal of resistor 9 and photoresistor 8, and a direct input connected to one terminal of a resistor 11. A feedback resistor 12 is connected from the output of differential amplifier 10 to the above-mentioned inverting input. In the embodiment shown in FIG. 1, the photoresistor 8 is mounted behind the aperture in the direction of light propagation. A first and second source of electrical energy, namely a battery 13 and a battery 14 are connected in series, the positive side of battery 13 adn the negative side of battery 14 constituting the supply lines for differential amplifier 10. A photoresistor 8 of course constitutes a light-sensitive element.

An astable multivibrator also receives it supply voltage through the combined voltage of batteries 13 and 14. The astable multivibrator, enclosed in block 2, has two transistors 15 and 16. A resistor 17 is connected into the collector circuit of transistor 15, while a resistor 18 is connected in the collector circuit of transistor 16. The collector of transistor 15 is connected to the base of a transistor 16 through a capacitor 19, while the collector of transistor 16 is connected through a capacitor 20 to the base of transistor 15. Capacitor 19 in combination with a resistor 21 which has one terminal connected to the base of transistor 16 and the other terminal connected to the positive side of battery 13 forms a first timing circuit, while a second timing circuit is constituted by capacitor 20 and a resistor 22 having one terminal connected to the base of transistor 15 and a second terminal connected to the positive side of battery 13. The astable multivibrator oscillates with a frequency which is determined by the above-mentioned timing circuit. The collector of transistor 16 is further connected to the base of a transistor 24 through a resistor 23. Transistor 24 is an output transistor connected as an emitter follower and having an emitter resistor 25.

The gating means comprise first and second gating means, respectively having a transistor 26 and a transistor 30 connected as emitter followers. The emitter resistor of transistor 26 is labelled 27, while the emitter resistor of transistor 30 is labelled 31. The terminal of resistor 27 not connected to the emitter of transistor 26 is connected to the common point of batteries 13 and 14. Diode 28 has an anode connected to the emitter of transistor 24, and a cathode connected to the collector of transistor 26. The base of transistor 26 is connected through a resistor 29 to the output of differential amplifier 10.

Transistor 30 must be of the opposite conductivity type of transistor 26. The terminal of resistor 31 not connected to the emitter of transistor 30 is also connected to the common point of batteries 13 and 14. Further, the collector of transistor 30 is connected to the anode of a diode 32, whose cathode is connected to the emitter of transistor 24. The base of transistor 30 is connected to the output of differential amplifier 10 through a resistor 33.

The emitter of transistor 26 is connected to the first gating output E1 through a diode 34, while the emitter of transistor 30 is connected to the base of transistor 36 through a diode 35. The collector of transistor 36 is directly connected to the second gating output, labelled E2 in FIG. 1. It is further connected to the positive side of battery 13 through a resistor 37. The emitter of transistor 36 is directly connected to the common point of batteries 13 and 14.

The voltage at the output of astable multivibrator 2 varies between the positive potential of battery 13 and the negative potential of battery 14. However, the reference level for the gating means 3 is the zero level existing at the common point of batteries 13 and 14. Thus when transistor 26 is conductive, only pulses positive with respect to the reference level will be applied at output E1 to the step motor means 4. When transistor 30 is conductive, negative pulses appear at the base of transistor 36 which therefore becomes blocked, causing positive pulses to be applied at output E2. Since, however, only one of the transistors 26 or 30 is conductive, depending upon the polarity of the output voltage of differential amplifier 10, positive pulses are applied to the step motor means at only one of the termnals E1 or E2 at any one time.

The step motor means 4 has three coils 38, 39 and 40. Coil 38 is connected in series with a thyristor 41, coil 39 with a thyristor 42 and coil 40 with a thyristor 43. The anodes of these thyristors are connected to the respective coils, while their cathodes are connected in common to the parallel combination of a capacitor 44 and a resistor 45 whose other terminal is connected to the common point of batteries 13 and 14. The anode of thyristor 41 is connected through a coupling capacitor 46 to the anode of thyristor 42, while the anode of thyristor 42 is in turn connected to the anode of thyristor 43 through a coupling capacitor 47. Finally, a coupling capacitor 48 is connected between the anode of thyristor 43 and the anode of thyristor 41.

The gates of thyristors 41, 42 and 43 are connected through resistors 49, 50 and 51, respectively, with the common point of batteries 13 and 14. The anode of a diode 52, 53 and 54 is connected to point E1, while the respective cathodes are connected through coupling capacitors 55, 56 and 57 respectively to the gates of thyristors 41, 42 and 43. Further, resistors 58, 59 and 60 are connected from the cathodes of diodes 52, 53 and 54 to the anodes of thyristors 42, 43 and 41, respectively.

The anodes of diodes 61, 62 and 63 are connected to point E2, while their cathodes are respectively connected to the gates of thyristors 42, 43 and 41, respectively, through coupling capacitors 64, 65 and 66, respectively. Further, the cathodes of diodes 61, 62 and 63 are, respectively, connected through resistors 67, 68 and 69 to the andoes of thyristors 41, 42 and 43.

Connected in parallel with coils 38, 39 and 40 are diodes 70, 71 and 72, respectively.

Pulses furnished at the output E1 of the gating means cause a stepwise closing of the aperture 7, while pulses furnished at output E2 of the gating means cause the aperture of diaphragm 7 to be opened.

Figure 2:
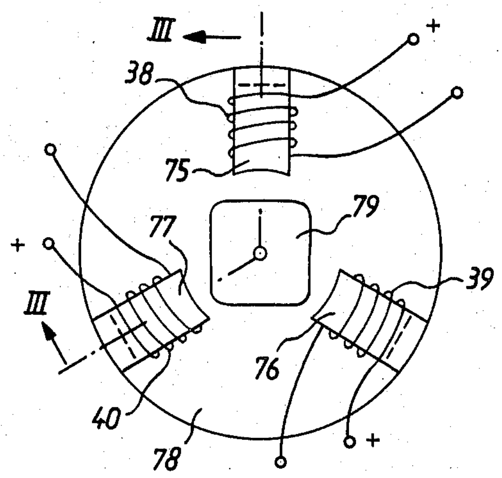
FIG. 2 is a schematic diagram showing the electromagnetic step motor means.
Figure 3:
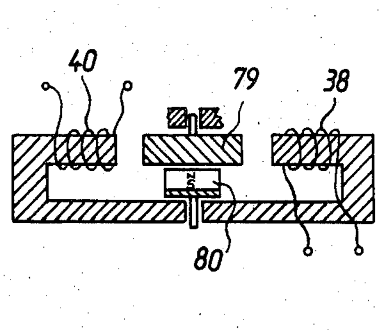
FIG. 3 is a sectional view of the motor of FIG. 2.

As shown in FIG. 2, coils 38, 39 and 40 are placed at 120° angles from each other. The coils are wound, respectively, around soft iron cores 75, 76 and 77. A magnetically conductive plate 78 closes the magnetic circuit to armature 79. Armature 79 of course also consists of magnetically conductive material. Underneath the armature is placed a permanent magnet 80, which is arranged coaxially therewith. The armature is embodied in a disk 79 which has a substantially rectangular cross-section. When one of coils 38, 39 or 40 is energized, the disk 79 rotates until one of its side surfaces is perpendicular to the magnetic field lines generated by the energized coil. In this position the other sides form acute angles relative to the magnetic field lines which would exist were the other coils energized.

The above-described arrangement operates as follows:

First let it be assumed that when the camera is first put into operation, the actual size of the aperture does not correspond to the desired size. Thus the voltages at the two inputs of differential amplifier 10 are not equal. Depending upon the sign of the difference therebetween, the output of differential amplifier 10 will be either positive or negative. The polarity of voltage at the output of differential amplifier thus indicates whether the actual aperture size is greater or smaller than the desired aperture size.

As mentioned above, astable multivibrator 2 furnishes a sequence of pulses whose frequency depends upon the elements 19, 21 and 20, 22. Relative to the voltage existing at the common point of batteries 13 and 14, herein referred to as the reference level, both positive and negative pulses appear in an alternating fashion at the output of astable multivibrator 2, that is at the emitter of transistor 24.

Let it now be assumed that a positive voltage exists at the output of differential amplifier 10. Thus transistor 26 is conductive, causing positive voltages to be transmitted through diode 34 to the first gating output E1. Of course under these conditions transistor 30 is blocked, so that no pulses appear at terminal E2.

Let it be assumed that thyristor 41 is conductive, while thyristors 42 and 43 are blocked. Therefore, current is flowing through coil 38, while both coils 39 and 40 are deenergized. A pulse appearing at terminal E1 thus does not affect thyristor 41 which is already conductive. However, after thyristor 41 became conductive, capacitors 46 and 48 charged. However capacitor 47 did not charge. The positive pulse applied at terminal E1 is applied through diode 53 and coupling capacitor 56 to the gate of thyristor 42. Thyristor 42 thus becomes conductive. The voltage at its anode thus changes substantially immediately from a positive value to zero. This negative pulse causes a change in voltage across capacitor 46, so that a negative pulse is applied to the anode of thyristor 41. Thyristor 41 thus blocks.

The positive pulse at terminal E1 cannot reach the gate of thyristor 43, since diode 54 is blocked. Further, at the time that thyristor 42 becomes conductive, the anode-cathode circuit of thyristor 43 is short circuited through coupling capacitor 47 and thyristor 42. Capacitor 47 charges to the voltage of battery 13, while capacitors 46 and 47 discharge. The next subsequent positive pulse at terminal E1 causes thyristor 43 to become conductive and the previously conductive thyristor 42 to block. The next sequential pulse then causes thyristor 41 to be conductive, while thyristor 43 blocks.

In this manner a rotating magnetic field which rotates in a stepwise fashion is furnished, which is followed by a corresponding movement of the armature 79. Because of the mechanical couplings 5 and 6, the aperture of diaphragm 7 is closed in a corresponding stepwise fashion. In a preferred embodiment of the present invention the armature is closed one-tenth of one *f* stop for each pulse applied at terminal E1. When the aperture size reaches the desired aperture size, the differential amplifier output voltage will be zero. This will cause both transistors 26 and 30 to block. Thus the pulses generated by monostable multivibrator 2 will no longer be applied to the step motor means.

If it is now assumed that a negative voltage appears at the output of differential amplifier 10, transistor 26 is blocked, while transistor 30 becomes conductive. Negative pulses appearing at the output of astable multivibrator 2 are applied through diode 32 to the emitter of transistor 30. These pulses are applied to the base of transistor 36 through diode 35, thereby blocking transistor 36 and causing positive pulses to appear at its collector. Thus positive pulses are also furnished at terminal E2. Coils 38, 39 and 40 are now energized, but in the sequence reversed to the sequence when pulses appear at terminal E1. Again, let it be assumed that thyristor 41 is conductive, while thyristors 42 and 43 are blocked. Capacitors 46 and 48 are charged. The positive pulse cannot reach thyristor 42, since diode 61 is blocked. However, the positive pulse reaches the gate of thyristor 43 via diode 62 and capacitor 65. Thyristor 43 thus becomes conductive. When thyristor 43 becomes conductive, a negative going pulse is applied to the anode of thyristor 41, thyristor 41 therefore blocks. Simulatneously capacitor 47 charges. Further, capacitor 47, at the beginning of its charging operation, represents a short-circuit for thyristor 42. For the next positive pulse at terminal E2, thyristor 42 becomes conductive, while thyristor 43 is blocked. Each further pulse at terminal E2 causes the armature to rotate one step and therefore causes the aperture opening to be increased by one step until such time as the output voltage of operational amplifier 10 is again zero. The zero voltage, as explained above, blocks the gating means so that no further pulses are available at either terminals E1 or E2.

Figure 4:
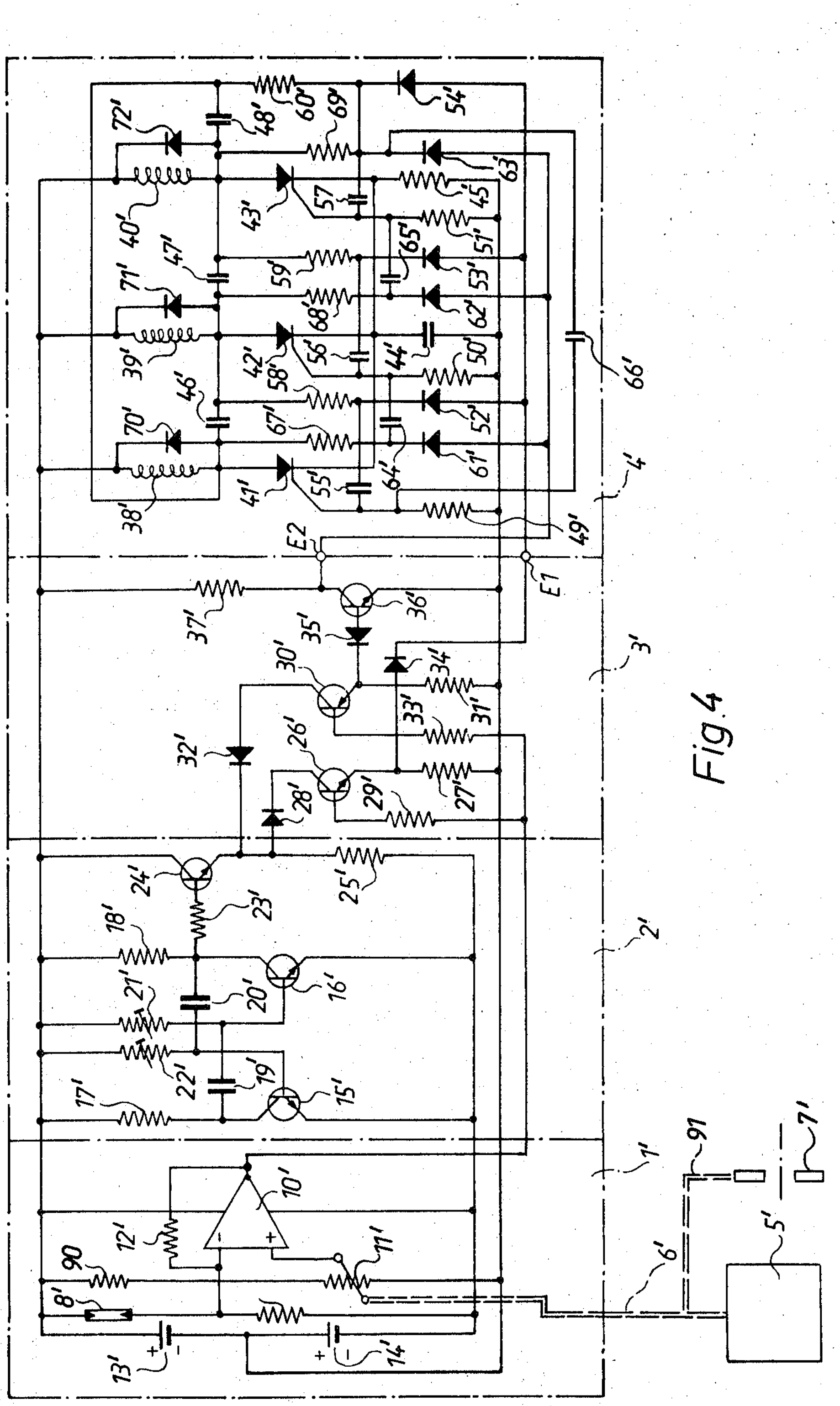
FIG. 4 is the schematic diagram of a second embodiment of the present invention.

In the embodiment shown in FIG. 4, the elements which are the same as those in FIG. 1 have the same reference numerals, but with a prime sign. The main difference between FIGS. 4 and 1 is that the photoresistor 8' of FIG. 4 is not positioned behind the diaphragm. Therefore a resistor 11' is provided for furnishing the actual aperture signal. Specifically, resistor 11' is a variable resistor which is connected in series with a fixed resistor 90. Resistor 11' has a wiper arm which is mechanically coupled to the mechanical element 5' of the step motor means 4' via the coupling means 6'. When armature 79 turns, the wiper arm is moved along resistor 11' in a stepwise fashion in one or the other direction depending upon the direction of rotation of armature 79. Simultaneously, the aperture size is adjusted by means of the mechanical coupling 91. The functioning of the remainder of the circuit is of course the same as that of FIG. 1.

While the invention has been illustrated and described as embodied in specific control circuit means and step motor means, it is not intended to be limited to the details shown, since various modifications and circuit changes may be made without departing in any way from the spirit of the present invention.

Without further analysis, the foregoing will so fully reveal the gist of the present invention that others can be applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent iw set forth in the appended claims:

1. In a camera having light sensitive means for furnishing an exposure signal corresponding to the available light for an exposure, and having a diaphragm having an adjustable aperture, an arrangement for adjusting the size of said aperture to a desired size corresponding to said exposure signal, comprising, in combination, first means coupled to said light sensitive means and to said diaphragm, for furnishing a first output signal when said actual size of said aperture is less than said desired size and for furnishing a second output signal when said actual size of said aperture exceeds said desired size; electromagnetic step switch means operable in a first or second direction for, respectively, increasing and decreasing the size of said aperture a predetermined increment in response to a predetermined number of control pulses; and control circuit means connected to said electromangetic step switch means and said first means for furnishing said control pulses for operating said electromagnetic step switch means in said first direction in response to said first output signal and for furnishing said control pulses for operating said electromagnetic step switch means in said second direction in response to said second output signal.

2. An arrangement as set forth in claim 1, wherein said first means comprise a differential amplifier for furnishing a differential amplifier output signal; and wherein said first output signal is a differential amplifier signal having a first polarity and said second output signal is a differential amplifier signal having a second polarity opposite to said first polarity.

3. An arrangement as set forth in claim 2, wherein said control circuit means comprise pulse generator means for furnishing a pulse sequence, and first and second gating means each having an input connected to said pulse generator means and having, respectively, a first and second gating output for furnishing a first and second pulse sequence at said first and second gating outputs respectively in response to differential amplifier output signals having said first and second polarity respectively.

4. An arrangement as set forth in claim 3, wherein said first and second gating means respectively comprise a first and second emitter follower stage, having, respectively, an npn and a pnp transistor.

5. An arrangement as set forth in claim 4, further comprising a first source of electrical energy having a positive and negative output terminal, a second source of electrical energy having a positive and negative output terminal, means connecting said negative output terminal of said first source of electrical energy to said positive output terminal of said second source of electrical energy; and wherein said differential amplifier means has a positive supply line connected to said positive output terminal of said first source of electrical energy and a negative supply line connected to said negative output terminal of said second source of electrical energy; wherein said pluse generator means has a positive supply terminal connected to said positive terminal of said first source of electrical energy and a negative supply input connected to said negative terminal of said second source of electrical energy; and wherein said first and second gating means have a common supply input connected to said common point and a common control input connected to the output of said differential amplifier means.

6. An arrangement as set forth in claim 3, wherein said electronic step switch means comprise an armature, a plurality of electromagnetic coils arranged radially to said armature, and coil energizing circuit means connected to said coils and said first and second gating outputs for energizing said coils in a first predetermined sequence in response to said pulse sequence received at said first gating output and in a second predetermined sequence in response to the pulse sequence received at said second gating output, in such a manner that said amrature rotates in a first direction in response to pulses received at said first gating output and in a second direction in response to pulses received at said second gating output.

7. An arrangement as set forth in claim 6, wherein said coil energizing circuit means comprise a plurality of semi-conductor switch means each having a conductive state in response to a control signal applied thereto, each connected to a corresponding one of said coils in such a manner that said coil is energized when said semi-conductor switch means is in said conductive state.

8. An arrangement as set forth in claim 7, further comprising coupling means for intercoupling said semiconductor switch means in such a manner that each of said semi-conductor switch means is switched to the non-conductive state upon switching of the next subseqeunt one of said semi-conductor switch means to the conductive state.

9. An arrangement as set forth in claim 8, wherein said first and second pulse sequence each comprise a plurality of pulses; and wherein said armature rotates a predetermined angle in response to each of said pulses and wherein said electronic step switch means is coupled to said diaphragm means in such a manner that rotation of said predetermined angle changes said aperture size by a predetermined fraction of said predetermined increment.

10. An arrangement as set forth in claim 3, wherein said pulse generator means comprise an astable multivibrator.

11. An arrangement as set forth in claim 1, wherein said light sensitive means comprise light sensitive means positioned behind said diaphragm means in the direction of light propagation.

12. An arrnagment as set forth in claim 1, wherein said light sensitive means is positioned in front of said diaphragm means in the direction of light propagation; and wherein said means for furnishing an aperture signal comprise resistor means having a wiper arm mechanically coupled to said electromagnetic step switch means and electrically connected to said second input of said differential amplifier means.

* * * * *